United States Patent
Sugimoto

(10) Patent No.: US 9,545,920 B2
(45) Date of Patent: Jan. 17, 2017

(54) MISFIRE DETERMINATION DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Hitoki Sugimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/948,979

(22) Filed: Nov. 23, 2015

(65) Prior Publication Data

US 2016/0152231 A1  Jun. 2, 2016

(30) Foreign Application Priority Data

Nov. 27, 2014  (JP) .................................. 2014-239929

(51) Int. Cl.
*G01M 15/11* (2006.01)
*G01M 15/12* (2006.01)
(Continued)

(52) U.S. Cl.
CPC ............ *B60W 20/50* (2013.01); *F02B 77/085* (2013.01); *G01M 15/11* (2013.01); *G01M 15/12* (2013.01);
(Continued)

(58) Field of Classification Search
USPC ......... 701/104, 111, 105; 73/114.02, 114.03, 73/114.26, 114.07, 114.08; 60/285
See application file for complete search history.

(56) References Cited

U.S. PATENT DOCUMENTS 7,503,207 B2 * 3/2009 Nishigaki .............. G01M 15/11
                                                    73/114.02
8,041,502 B2 * 10/2011 Akimoto .................. B60K 6/26
                                                      701/111
(Continued)

FOREIGN PATENT DOCUMENTS

JP     2001-317402      11/2001
JP     2007-170248       7/2007
(Continued)

OTHER PUBLICATIONS

Study on energy management strategy of hybrid electric vehicle with an electromagnetic continuously variable transmission; Zhu Liming; He Hongwen; Zhou Xiaolin; Power Electronics Systems and Applications (PESA), 2011 4th International Conference on Year: 2011; pp. 1-6, DOI: 10.1109/PESA.2011.5982965.*

(Continued)

*Primary Examiner* — Cuong H Nguyen
(74) *Attorney, Agent, or Firm* — Finnegan, Henderson, Farabow, Garrett & Dunner, LLP

(57) ABSTRACT

When a rotational fluctuation $\Delta NEeng$ of an engine is equal to or larger than a first threshold $NEref1$, a rotational fluctuation $\Delta NEmg1$ of a motor MG1 that is calculated at a timing preceding the rotational fluctuation $\Delta NEeng$ of the engine by 180 degrees in terms of a rotational angle of a crankshaft is compared with a second threshold $NEref2$. When the rotational fluctuation $\Delta NEmg1$ is equal to or larger than the second threshold $NEref2$, it is determined that the rotational fluctuation $\Delta NEeng$ of the engine has reached a value equal to or larger than a threshold $NEref$ due to a disturbance such as running on a bad road or the like, and a misfire counter is maintained. When the rotational fluctuation $\Delta NEmg1$ is smaller than the second threshold $NEref2$, it is determined that a misfire may be occurring in at least (Continued)

one of cylinders of the engine, and the misfire counter is incremented.

4 Claims, 4 Drawing Sheets

(51) Int. Cl.
  *B60W 20/00* (2016.01)
  *F02B 77/08* (2006.01)
  *G07C 5/08* (2006.01)
(52) U.S. Cl.
  CPC ............. *G07C 5/08* (2013.01); *B60W 2400/00* (2013.01); *B60W 2510/0685* (2013.01); *B60W 2510/08* (2013.01); *Y10S 903/905* (2013.01)

(56) References Cited

U.S. PATENT DOCUMENTS

| | | | | |
|---|---|---|---|---|
| 8,136,390 | B2* | 3/2012 | Arakawa | G01M 15/11 73/114.02 |
| 8,676,477 | B2* | 3/2014 | Nagakura | F02D 41/1498 701/111 |
| 8,892,280 | B2* | 11/2014 | Kinoshita | B60G 17/0164 318/139 |
| 8,949,001 | B2* | 2/2015 | Suzuki | F02D 41/3005 123/691 |
| 2009/0118990 | A1* | 5/2009 | Suzuki | B60K 6/24 701/111 |
| 2010/0288035 | A1* | 11/2010 | Arakawa | G01M 15/11 73/114.03 |
| 2011/0231084 | A1* | 9/2011 | Nagakura | F02D 41/1498 701/111 |
| 2013/0261936 | A1* | 10/2013 | Suzuki | F02D 41/3005 701/104 |

FOREIGN PATENT DOCUMENTS

| | | | | |
|---|---|---|---|---|
| JP | 2010-264854 | | 11/2010 | |
| WO | WO2008/015860 | * | 2/2008 | ............... B60K 6/26 |

OTHER PUBLICATIONS

On-line Estimation of Net Engine Torque from Crankshaft Angular Velocity Measurement using Repetitive Estimators; Krishnaswami Srinivasan; Giorgio Rizzoni; Mohammed Trigui; Guan-Chun Luh; American Control Conference, 1992 Year: 1992; pp. 516-520.*

* cited by examiner

MISFIRE DETERMINATION DEVICE FOR INTERNAL COMBUSTION ENGINE

INCORPORATION BY REFERENCE

The disclosure of Japanese Patent Application No. 2014-239929 filed on Nov. 27, 2014 including the specification, drawings and abstract is incorporated herein by reference in its entirety.

BACKGROUND OF THE INVENTION

1. Field of the Invention

The invention relates to a misfire determination device for an internal combustion engine, and more particularly, to a misfire determination device for the internal combustion engine in a hybrid vehicle that is equipped with an internal combustion engine including a plurality of cylinders that can output a motive power for running and an electric motor that is mechanically connected to an output shaft of this internal combustion engine.

2. Description of Related Art

Conventionally, as this kind of misfire determination device for an internal combustion engine, that which detects a driving condition of a hybrid vehicle based on an operation state of an electric motor of the vehicle, and which determines whether or not the vehicle is driven on a condition that may lead to fulfillment of a condition of erroneous detection of a misfire in an internal combustion engine has been proposed (e.g., see Japanese Patent Application Publication No. 2001-317402 (JP 2001-317402 A)). With this device, when it is determined that the vehicle is driven on the condition that may lead to fulfillment of the condition of erroneous detection of a misfire in the internal combustion engine, a misfire detection process is suppressed or suspended. Thus, erroneous detection of a misfire in the internal combustion engine is more reliably avoided.

SUMMARY OF THE INVENTION

The aforementioned misfire detection device for the internal combustion engine makes a determination on the possibility of erroneous detection of a misfire in the internal combustion engine based only on the operation state of the electric motor that is connected to an axle. The operation state of the electric motor also changes when a misfire occurs in the internal combustion engine. Therefore, even when a change in the operation state of the electric motor is ascribable to a misfire in the internal combustion engine, it is determined that a misfire in the internal combustion engine may be erroneously detected, and the misfire in the internal combustion engine cannot be detected in some cases.

A misfire determination device for an internal combustion engine according to the invention makes a more adequate determination on a misfire in an internal combustion engine.

A misfire determination device according to one aspect of the invention includes an internal combustion engine, an electric motor, and a misfire determination device. The internal combustion engine includes a plurality of cylinders that output a motive power for running. The electric motor is mechanically connected to an output shaft of the internal combustion engine. The misfire determination device includes at least one electronic control unit that is configured to a) calculate a rotational fluctuation of the internal combustion engine, b) calculate a rotational fluctuation of the electric motor, and c) determine that a misfire may be occurring in at least one of the cylinders of the internal combustion engine when (i) the rotational fluctuation of the internal combustion engine has exceeded a first threshold and (ii) the rotational fluctuation of the electric motor that is calculated at a time preceding a time when the rotational fluctuation of the internal combustion engine that has exceeded the first threshold is calculated by a predetermined crank angle is smaller than a second threshold.

In the aforementioned aspect of the invention, when the rotational fluctuation of the internal combustion engine exceeds the first threshold, it is determined whether or not the rotational fluctuation of the electric motor that is calculated at the time preceding the time when the rotational fluctuation of the internal combustion engine that has exceeded the first threshold is calculated by the predetermined crank angle has exceeded the second threshold. Then, when the rotational fluctuation of the electric motor is smaller than the second threshold, it is determined that a misfire may be occurring in at least one of the cylinders of the internal combustion engine. When a misfire occurs in at least one of the cylinders of the internal combustion engine, the rotational fluctuation of the internal combustion engine changes, and then the rotational fluctuation of the electric motor that is mechanically connected to the output shaft of the internal combustion engine changes. On the other hand, a disturbance resulting from running on a bad rod and a disturbance resulting from transient driving operation by a driver cause changes in the rotational fluctuation of the electric motor, and then the rotational fluctuation of the internal combustion engine changes. Therefore, when the rotational fluctuation of the internal combustion engine exceeds the first threshold for making a determination on a misfire and the rotational fluctuation of the electric motor that is calculated at the time preceding the time when this rotational fluctuation is calculated by the predetermined crank angle is smaller than the second threshold, the rotational fluctuation of the internal combustion engine changes earlier than the rotational fluctuation of the electric motor, so it is determined that a misfire may occur in the internal combustion engine. Incidentally, when the rotational fluctuation of the electric motor is equal to or larger than the second threshold, the rotational fluctuation of the electric motor changes earlier than the rotational fluctuation of the internal combustion engine, so it is determined that there is a high possibility of a disturbance and that there is a low possibility of a misfire in the internal combustion engine. It should be noted herein that "the first threshold" is a threshold that is not exceeded by the rotational fluctuation of the internal combustion engine when a misfire is not occurring in any of the cylinders of the internal combustion engine and that is exceeded by the rotational fluctuation of the internal combustion engine when a misfire is occurring in at least one of the cylinders of the internal combustion engine, and can be obtained through an experiment or the like. Besides, "the second threshold" is a threshold that is not exceeded by the rotational fluctuation of the electric motor when a misfire is not occurring in any of the cylinders of the internal combustion engine and that is exceeded by the rotational fluctuation of the electric motor when a misfire is occurring in at least one of the cylinders of the internal combustion engine, and can be obtained through an experiment or the like.

It should be noted herein that the predetermined crank angle can be a crank angle of an ignition cycle of the internal combustion engine. When a misfire is not occurring in any of the cylinders of the internal combustion engine, the rotational fluctuation of the internal combustion engine is periodical due to ignition in the respective cylinders, and hence demonstrates the same behavior for each crank angle at intervals of ignition. Accordingly, when the rotational fluctuation is obtained as a difference between a time length required for rotation by a predetermined angle at that time (a predetermined rotational speed required time length) and the predetermined rotational speed required time length preceding that time by the crank angle of the ignition cycle, periodical fluctuation components can be removed, and the fluctuation resulting from the behavior of the other components can be expressed. Incidentally, the inverse (which is equivalent to a rotational angular velocity) of the predetermined rotational speed required time length can be used instead of the predetermined rotational speed required time length.

In the aforementioned aspect of the invention, the electronic control unit may be configured to determine that a misfire is occurring in the internal combustion engine when it is determined a predetermined number of times or more that a misfire may be occurring in at least one of the cylinders of the internal combustion engine. In this manner, a more adequate determination on a misfire in the internal combustion engine can be made.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Next, a mode for carrying out the invention will be described using an embodiment thereof.

Figure 1:
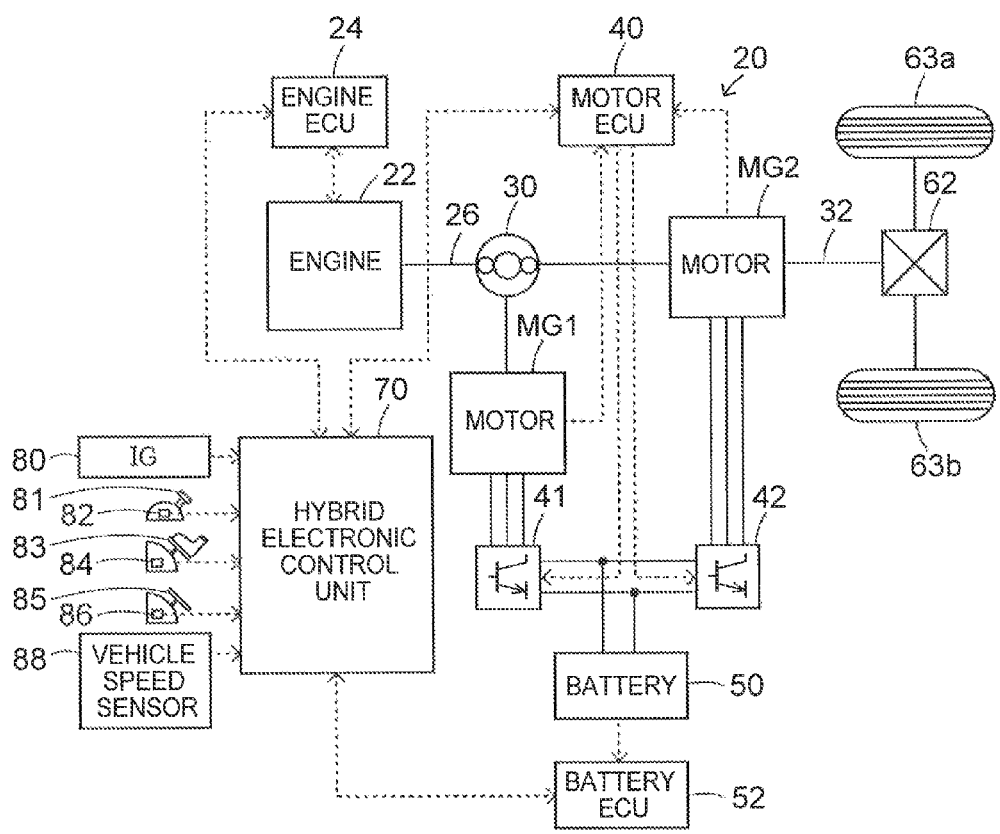
FIG. 1 is a block diagram showing the outline of the configuration of a hybrid automobile according to the embodiment of the invention.

FIG. 1 is a block diagram showing the outline of the configuration of a hybrid automobile 20 that is mounted with a misfire determination device for an internal combustion engine as one embodiment of the invention. As shown in the drawing, the hybrid automobile 20 according to the embodiment of the invention is equipped with an engine 22, and an engine electronic control unit (hereinafter referred to as an engine ECU) 24 that executes fuel injection control, ignition control, intake air amount adjustment control and the like of the engine 22. Besides, the hybrid automobile 20 according to the embodiment of the invention is equipped with a planetary gear 30. The planetary gear 30 has a carrier that is connected to a crankshaft 26 as an output shaft of the engine 22, and a ring gear that is connected to a drive shaft 32 that is coupled to driving wheels 63a and 63b via a differential gear 62. A rotor of a motor MG1 that is configured as, for example, a synchronous generator-motor is connected to a sun gear of the planetary gear 30. A rotor of a motor MG2 that is configured as, for example, a synchronous generator-motor is connected to the drive shaft 32. The motors MG1 and MG2 are driven by inverters 41 and 42 respectively. Switching control of switching elements (not shown) of the inverters 41 and 42 is executed by a motor electronic control unit (hereinafter referred to as a motor ECU) 40, and the motors MG1 and MG2 are thereby drivingly controlled. The motors MG1 and MG2 exchange electric power with a battery 50 that is configured as, for example, a lithium-ion secondary battery, via the inverters 41 and 42 respectively. The battery 50 is managed by a battery electronic control unit (hereinafter referred to as a battery ECU) 52 using a battery voltage Vb, a battery current Ib, a battery temperature Tb and the like. The hybrid automobile 20 is further equipped with a hybrid electronic control unit (hereinafter referred to as an HVECU) 70 that controls the entire vehicle through communication with the engine ECU 24, the motor ECU 40 and the battery ECU 52.

Figure 2:
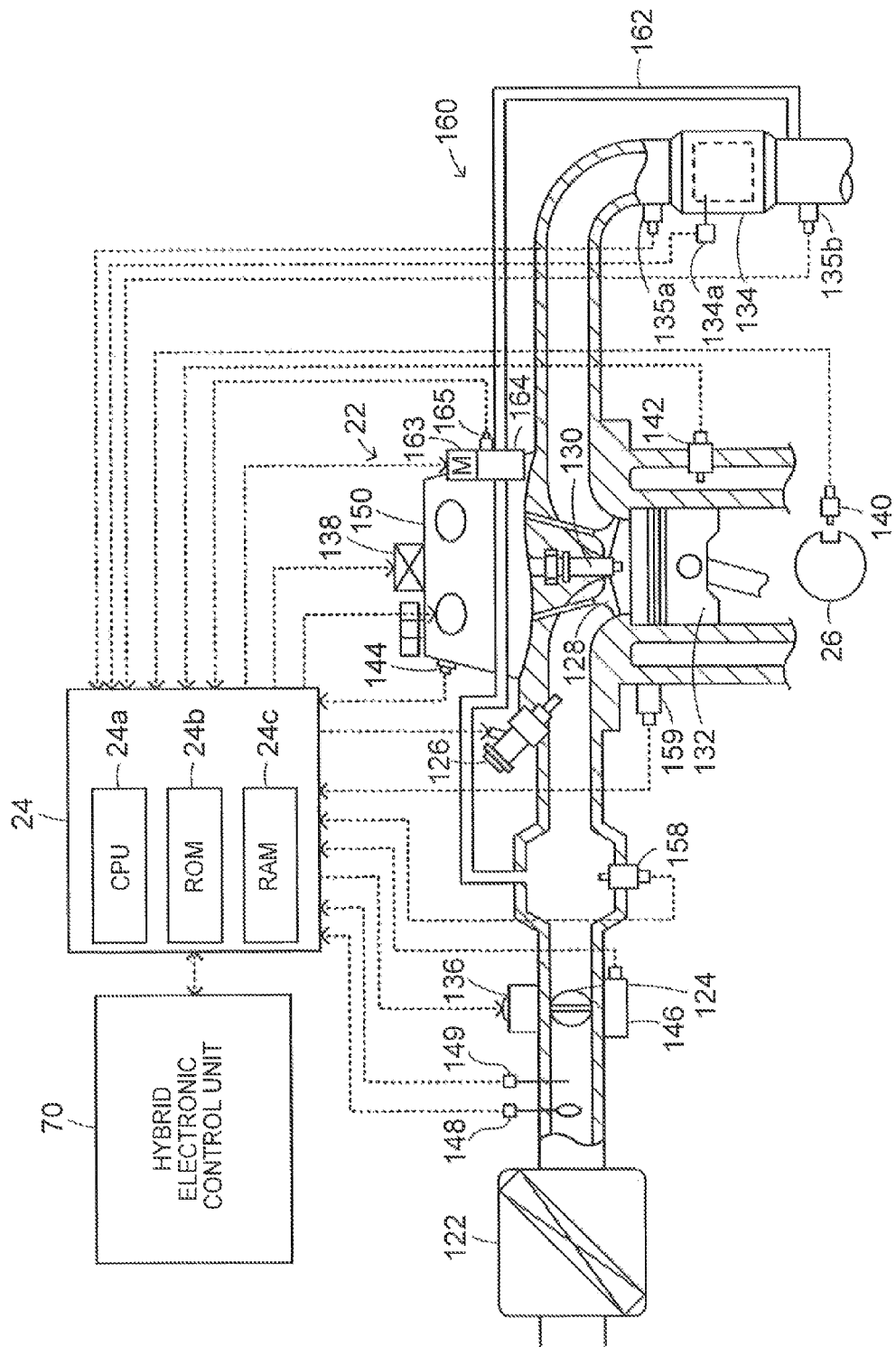
FIG. 2 is a block diagram showing the outline of the configuration of an engine.

The engine 22 is configured as a four-cylinder engine that outputs motive power by four strokes, namely, an intake stroke, a compression stroke, an expansion stroke and an exhaust stroke, using a hydrocarbon-based fuel, for example, gasoline, light oil or the like. As shown in FIG. 2, the engine 22 sucks the air cleaned by an air cleaner 122, via a throttle valve 124, injects gasoline from a fuel injection valve 126 to mix the sucked air with the gasoline, and sucks this mixture into a combustion chamber via an intake valve 128. The sucked mixture is burned through explosion by electric sparks generated by an ignition plug 130, and the engine 22 converts reciprocating motions of a piston 132, which is pressed down by the energy of explosion, into rotational motions of the crankshaft 26. Exhaust gas from the engine 22 is discharged to outside air via a purification device 134 having a purification catalyst (a three-way catalyst) that purifies noxious components such as carbon monoxide (CO), hydrocarbons (HC) and nitrogen oxides (NOx). Exhaust gas is not only discharged to outside air, but is also supplied to an intake side via an exhaust gas recirculation device (hereinafter referred to as "an EGR system") 160 that recirculates exhaust gas into intake air. The EGR system 160 is equipped with an EGR pipe 162 that is connected to a posterior stage of the purification device 134 to supply exhaust gas to a surge tank on the intake side, and an EGR valve 164 that is arranged in the EGR pipe 162 and that is driven by a stepping motor 163. The EGR system 160 adjusts the opening degree of the EGR valve 164 to adjust the recirculation amount of exhaust gas as unburned gas, and recirculates this exhaust gas to the intake side. In this manner, the engine 22 can suck the mixture of air, exhaust gas and gasoline into the combustion chamber.

The engine ECU 24 is configured as a microprocessor that is mainly constituted of a CPU 24a. In addition to the CPU 24a, the engine ECU 24 is equipped with a ROM 24b that stores processing programs, a RAM 24c that temporarily stores data, input/output ports (not shown), and a communication port (not shown). Signals from various sensors that detect a state of the engine 22 are input to the engine ECU 24 via the input ports respectively. As the signals from the various sensors, it is possible to mention a crank position from a crank position sensor 140 that detects a rotational position of the crankshaft 26, a coolant temperature Tw from a coolant temperature sensor 142 that detects a temperature of coolant of the engine 22, a cam position from a cam position sensor 144 that detects a rotational position of a camshaft that opens/closes an intake valve 128 for sucking air into the combustion chamber and an exhaust valve for discharging exhaust gas from the combustion chamber, a throttle opening degree TH from a throttle valve position sensor 146 that detects a position of the throttle valve 124, an intake air amount Qa from an airflow meter 148 that is attached to an intake pipe, an intake air temperature Ta from a temperature sensor 149 that is attached to the intake pipe, an intake air pressure Pin from an intake air pressure sensor 158 that detects a pressure in the intake pipe, a catalyst temperature Tc from a temperature sensor 134*a* that is attached to the purification device 134, an air-fuel ratio AF from an air-fuel ratio sensor 135*a*, an oxygen signal O2 from an oxygen sensor 135*b*, a knock signal Ks from a knock sensor 159 that is attached to a cylinder block to detect vibrations resulting from the occurrence of knocking, an EGR valve opening degree EV from an EGR valve opening degree sensor 165 that detects an opening degree of the EGR valve 164, and the like. Besides, various control signals for driving the engine 22 are output from the engine ECU 24 via the output ports respectively. As the various control signals, it is possible to mention a drive signal to the fuel injection valve 126, a drive signal to a throttle motor 136 that adjusts the position of the throttle valve 124, a control signal to an ignition coil 138 that is integrated with an igniter, a control signal to a variable valve timing mechanism 150 that can change the timings for opening/closing the intake valve 128, a drive signal to the stepping motor 163 that adjusts the opening degree of the EGR valve 164, and the like. The engine ECU 24 communicates with the hybrid electronic control unit 70, executes operation control of the engine 22 through a control signal from the hybrid electronic control unit 70, and outputs data on the operation state of the engine 22 if necessary. Incidentally, the engine ECU 24 calculates a rotational speed of the crankshaft 26, namely, a rotational speed Ne of the engine 22 based on the crank position from the crank position sensor 140, and calculates the intake air amount Qa from the airflow meter 148.

Although not shown in any of the drawings, the motor ECU 40 is configured as a microprocessor that is mainly constituted of a CPU. In addition to the CPU, the motor ECU 40 is equipped with a ROM that stores processing programs, a RAM that temporarily stores data, input/output ports, and a communication port. Signals required for drivingly controlling the motors MG1 and MG2, for example, rotational positions $\theta m1$ and $\theta m2$ from a rotational position detection sensor that detects rotational positions of the rotors of the motors MG1 and MG2, phase currents applied to the motors MG1 and MG2, which are detected by a current sensor (not shown), and the like are input to the motor ECU 40 via the input ports respectively. Switching control signals to the inverters 41 and 42 and the like are output from the motor ECU 40 via the output ports respectively. Besides, the motor ECU 40 communicates with the HVECU 70, drivingly controls the motors MG1 and MG2 through a control signal from the HVECU 70, and outputs data on the operation state of the motors MG1 and MG2 to the HVECU 70 if necessary. Incidentally, the motor ECU 40 calculates the rotational speeds Nm1 and Nm2 of the motors MG1 and MG2 as well based on the rotational positions $\theta m1$ and $\theta m2$ of the rotors of the motors MG1 and MG2 from the rotational position detection sensor.

Although not shown in any of the drawings, the battery ECU 52 is configured as a microprocessor that is mainly constituted of a CPU. In addition to the CPU, the battery ECU 52 is equipped with a ROM that stores processing programs, a RAM that temporarily stores data, input/output ports, and a communication port. Signals required for managing the battery 50, for example, the battery voltage Vb from a voltage sensor (not shown) that is installed between terminals of the battery 50, the battery current Ib from the current sensor (not shown) attached to an electric power line that is connected to the output terminal of the battery 50, the battery temperature Tb from a temperature sensor (not shown) that is attached to the battery 50, and the like are input to the battery ECU 52. Data on the state of the battery 50 are transmitted from the battery ECU 52 to the HVECU 70 through communication if necessary. Besides, the battery ECU 52 calculates an electrical storage ratio SOC as a ratio of the capacity of an electric power that can be discharged from the battery 50 at the time of detection of an integrated value of the battery current Ib to the total capacity based on the integrated value, and calculates input/output limits Win and Wout as maximum permissible electric powers with/of which the battery 50 may be charged/discharged, based on the calculated electrical storage ratio SOC and the battery temperature Tb, with a view to managing the battery 50.

Although not shown in any of the drawings, the HVECU 70 is configured as a microprocessor that is mainly constituted of a CPU. In addition to the CPU, the HVECU 70 is equipped with a ROM that stores processing programs, a RAM that temporarily stores data, a nonvolatile flash memory that retains the stored data, input/output ports, and communication ports. An ignition signal from an ignition switch 80, a shift position SP from a shift position sensor 82 that detects an operation position of a shift lever 81, an accelerator opening degree Acc from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88 and the like are input to the HVECU 70 via the input ports respectively. As described previously, the HVECU 70 is connected to the engine ECU 24, the motor ECU 40 and the battery ECU 52 via the communication ports respectively, and exchanges various control signals and data with the engine ECU 24, the motor ECU 40 and the battery ECU 52.

Figure 3:
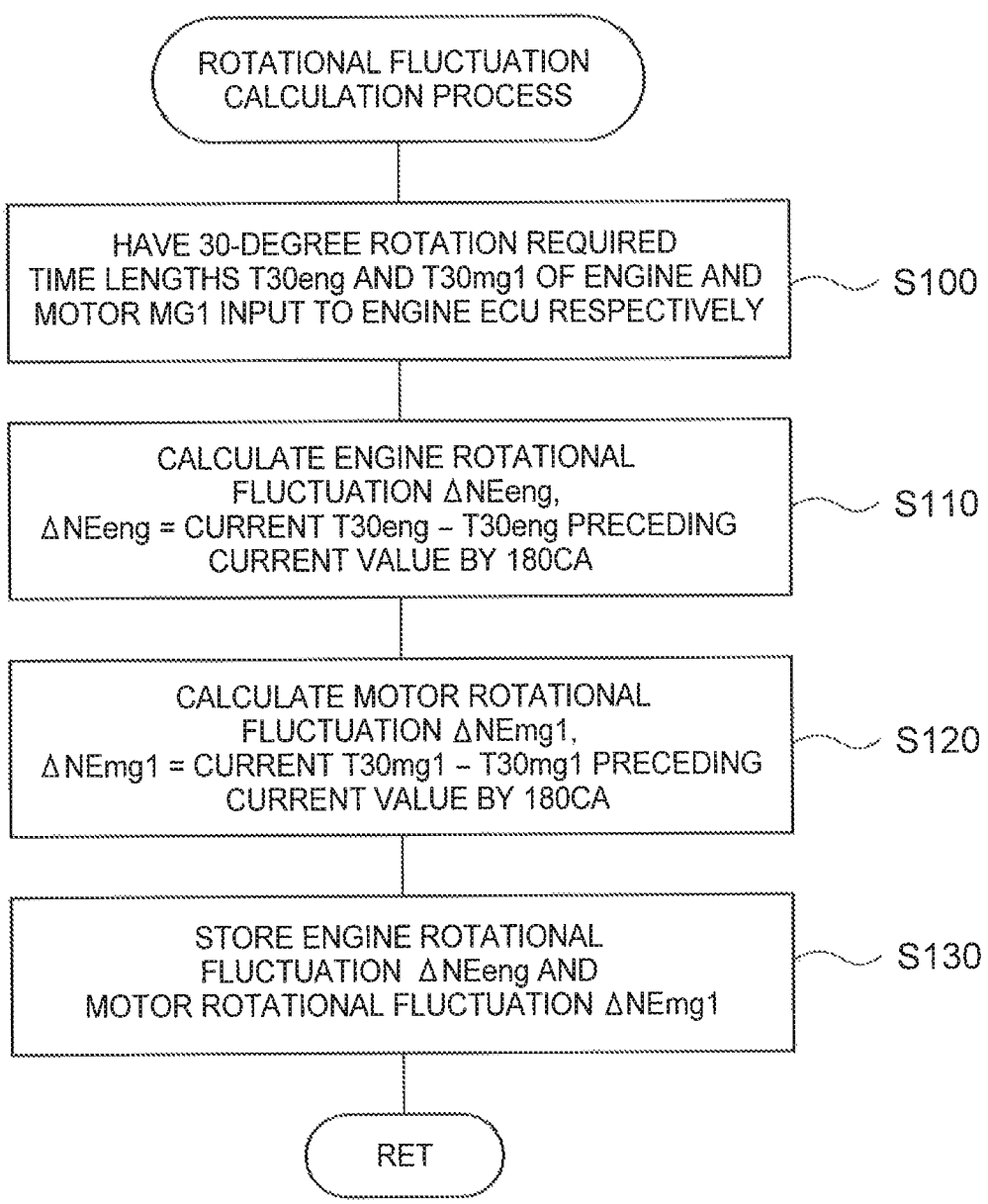
FIG. 3 is a flowchart showing an exemplary rotational fluctuation calculation process that is executed by an engine ECU.
Figure 4:
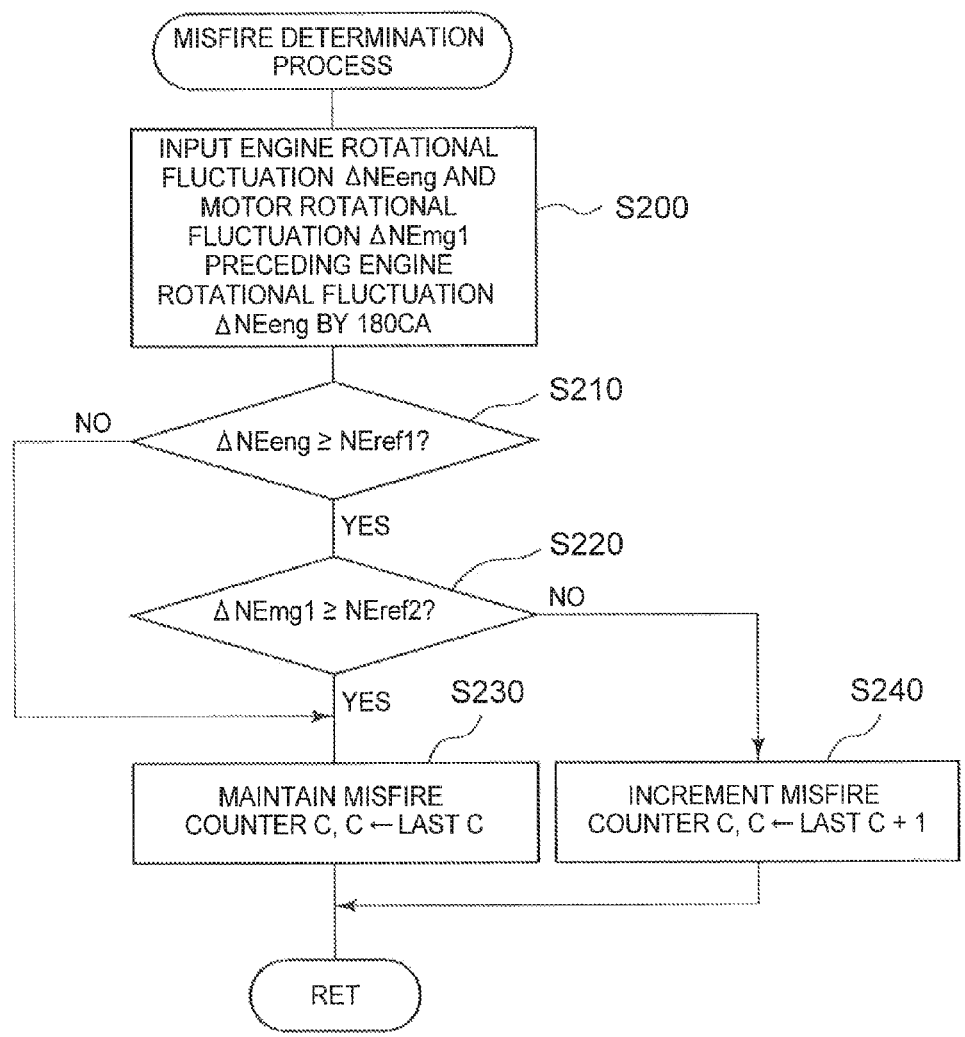
FIG. 4 is a flowchart showing an exemplary misfire determination process that is executed by the engine ECU.

Next, the operation of the misfire determination device for the internal combustion engine according to the embodiment of the invention thus configured will be described. FIG. 3 is a flowchart showing an exemplary rotational fluctuation calculation process that is executed by the engine ECU 24. FIG. 4 is a flowchart showing an exemplary misfire determination process that is executed by the engine ECU 24. The misfire determination process is executed using the rotational fluctuation. Therefore, the rotational fluctuation calculation process will be described first, and then the misfire determination process will be described.

When the rotational fluctuation calculation process is executed, the engine ECU 24 first has a 30-degree rotation required time length T30eng of the engine 22 and a 30-degree rotation required time length T30mg1 of the motor MG1 input thereto (step S100). The 30-degree rotation required time length T30eng of the engine 22 is computed as a time length required for rotation of the crankshaft 26 by 30 degrees, for example, every time the crankshaft 26 rotates by a predetermined angle (e.g., 10 degrees). The 30-degree rotation required time length T30eng of the engine 22 can be acquired by measuring a time length required until rotation of a crank position from the crank position sensor 140 by 30 degrees. The 30-degree rotation required time length T30mg1 of the motor MG1 is computed as a time length required for rotation of a rotary shaft of the motor MG1 by 30 degrees at the same timing as the 30-degree rotation required time length T30eng of the engine 22. The 30-degree rotation required time length T30mg1 of the motor MG1 can be acquired by measuring a time length required until rotation of the rotational position $\theta m1$ of the rotor of the motor MG1 from the rotational position detection sensor (not shown) by 30 degrees. Incidentally, the 30-degree rotation required time length T30mg1 of the motor MG1 is detected by the motor ECU 40, and can be input to the engine ECU 24 by being received thereby.

Subsequently, a rotational fluctuation ΔNEeng of the engine 22 is computed by subtracting, from the 30-degree rotation required time length T30eng of the engine 22, the 30-degree rotation required time length T30eng that is calculated at a timing preceding that value by 180 degrees in terms of the rotational angle of the crankshaft 26 (step S110). By the same token, a rotational fluctuation ΔNEmg1 of the motor MG1 is computed by subtracting, from the 30-degree rotation required time length T30mg1 of the motor MG1, the 30-degree rotation required time length T30mg1 that is calculated at a timing preceding that value by 180 degrees in terms of the rotational angle of the crankshaft 26 (step S120). The engine 22 according to the embodiment of the invention has four cylinders, and hence is ignited every time the crankshaft 26 rotates by 180 degrees. Therefore, the ignition cycle is equal to the cycle of rotational fluctuation of the engine 22. Accordingly, periodical fluctuation components of the 30-degree rotation required time length can be removed, and the other fluctuation components can be expressed as a difference from the 30-degree required time length preceding its current value by one cycle. In the embodiment of the invention, with a view to removing such periodical fluctuation components, a difference from that which precedes its current value by the ignition cycle (180 degrees in terms of the rotational angle of the crankshaft 26) is computed. Then, the computed rotational fluctuation ΔNEeng of the engine 22 and the computed rotational fluctuation ΔNEmg1 of the motor MG1 are stored into the RAM (not shown) (step S130), and the rotational fluctuation calculation process is ended.

In the misfire detection process, first of all, the most recently calculated rotational fluctuation ΔNEeng of the engine 22 and the rotational fluctuation ΔNEmg1 of the motor MG1 that is calculated at a timing preceding this rotational fluctuation ΔNEeng by 180 degrees in terms of the rotational angle of the crankshaft 26 are input (step S200). Then, the rotational fluctuation ΔNEeng of the engine 22 is compared with a first threshold NEref1 (step S210). It should be noted herein that the first threshold NEref1 is a value for determining whether or not a misfire is occurring in at least one of the cylinders of the engine 22, and can be obtained through an experiment or the like. When a misfire is occurring in at least one of the cylinders of the engine 22, the rotational speed becomes low due to the misfire, so the value of the rotational fluctuation ΔNEeng becomes large. Accordingly, when the rotational fluctuation ΔNEeng of the engine 22 is equal to or larger than the first threshold NEref1, it can be determined that a misfire may be occurring in at least one of the cylinders of the engine 22. When the rotational fluctuation ΔNEeng of the engine 22 is smaller than the first threshold NEref1, it can be determined that a misfire is not occurring in any of the cylinders of the engine 22. Therefore, when the rotational fluctuation ΔNEeng of the engine 22 is smaller than the first threshold NEref1, it is determined that a misfire is not occurring in any of the cylinders of the engine 22, a misfire counter C is maintained (step S230), and the misfire determination process is ended. The misfire counter C will be described later.

On the other hand, when the rotational fluctuation ΔNEeng of the engine 22 is equal to or larger than the first threshold NEref1, the rotational fluctuation ΔNEmg1 of the motor MG1 that is calculated at a timing preceding the rotational fluctuation ΔNEeng of the engine 22 by 180 degrees in terms of the rotational angle of the crankshaft 26 is compared with a second threshold NEref2 (step S220). It should be noted herein that the second threshold NEref2 is a value for determining whether or not a misfire is occurring in at least one of the cylinders of the engine 22 or a disturbance such as running on a bad road or the like is occurring, and can be obtained through an experiment or the like. When a misfire occurs in at least one of the cylinders of the engine 22, the rotational fluctuation is ascribable to the engine 22. Therefore, the rotational fluctuation ΔNEeng of the engine 22 first changes, and then the rotational fluctuation ΔNEmg1 of the motor MG1 changes. On the other hand, when a disturbance such as transient driving operation by the driver, running on a bad road or the like occurs, the rotational fluctuation is ascribable to an axle. Therefore, the rotational fluctuation ΔNEmg1 of the motor MG1 first changes, and then the rotational fluctuation ΔNEeng of the engine 22 changes. Accordingly, when it is determined in step S220 that the rotational fluctuation ΔNEmg1 of the motor MG1 is equal to or larger than the second threshold NEref2, it can be determined that the rotational fluctuation ΔNEeng of the engine 22 has reached a value equal to or larger than the first threshold NEref1 due to a disturbance such as transient driving operation by the driver, running on a bad road or the like. In this case, the misfire counter C is maintained (step S230), and the misfire determination process is ended. On the other hand, when the rotational fluctuation ΔNEmg1 of the motor MG1 is smaller than the second threshold NEref2 in step S220, it can be determined that a misfire may be occurring in at least one of the cylinders of the engine 22. In this case, the misfire counter C is incremented by a value of 1 (step S240), and the misfire determination process is ended. In the embodiment of the invention, with a view to more adequately determining whether or not a misfire is occurring in at least one of the cylinders of the engine 22, it is determined that a misfire is occurring in at least one of the cylinders of the engine 22 when it is determined a predetermined number of times that a misfire may be occurring in at least one of the cylinders of the engine 22. The misfire counter C is used to execute this process. Accordingly, when the misfire counter C reaches a value determined in advance, it is determined that a misfire is occurring in at least one of the cylinders of the engine 22.

With the misfire determination device for the internal combustion engine according to the embodiment of the invention described above, when the rotational fluctuation ΔNEeng of the engine 22 is equal to or larger than the first threshold NEref1, the rotational fluctuation ΔNEmg1 of the motor MG1 that is calculated at a timing preceding the rotational fluctuation ΔNEeng of the engine 22 by 180 degrees in terms of the rotational angle of the crankshaft 26 is compared with the second threshold NEref2. Then, when it is determined that the rotational fluctuation ΔNEmg1 of the motor MG1 is equal to or larger than the second threshold NEref2, it is determined that the rotational fluctuation ΔNEeng of the engine 22 has reached a value equal to or larger than the threshold NEref due to a disturbance such as transient driving operation by the driver, running on a bad road or the like. When it is determined that the rotational fluctuation ΔNEmg1 of the motor MG1 is smaller than the second threshold NEref2, it is determined that a misfire may be occurring in at least one of the cylinders of the engine 22. Thus, it can be more adequately determined whether a misfire may be occurring in at least one of the cylinders of the engine 22. Besides, with the misfire determination device for the internal combustion engine according to the embodiment of the invention, when it is determined the predetermined number of times that a misfire may be occurring in at least one of the cylinders of the engine 22, it is determined that a misfire is occurring in at least one of the cylinders of the engine 22. As a result, it can be more adequately determined whether or not a misfire is occurring in at last one of the cylinders of the engine 22.

With the misfire determination device for the internal combustion engine according to the embodiment of the invention, a determination on a misfire in the four-cylinder engine 22 is made. However, it is also appropriate to determine whether or not a misfire may be occurring in at least one of cylinders of a six-cylinder engine, or to determine whether or not a misfire may be occurring in at least one of cylinders of an eight-cylinder engine. In the case of the six-cylinder engine, the engine is ignited every time the crankshaft rotates by 120 degrees, so the ignition cycle is equal to 120 degrees. Accordingly, the rotational fluctuation ΔNE may be computed by subtracting, from the 30-degree rotation required time length at that time, a 30-degree rotation required time length T30 that is calculated at a timing preceding the value at that time by 120 degrees in terms of the crank angle of the crankshaft 26. Besides, in the case of the eight-cylinder engine, the engine is ignited every time the crankshaft rotates by 90 degrees, so the ignition cycle is equal to 90 degrees. Accordingly, the rotational fluctuation ΔNE may be computed by subtracting, from the 30-degree rotation required time length T30 at that time, the 30-degree rotation required time length T30 that is calculated at a timing preceding the value at that time by 90 degrees in terms of the rotational angle of the crankshaft 26. Incidentally, a difference from the rotational fluctuation at a timing preceding its current value by 2 ignition cycles may be taken into account in calculating the rotational fluctuation. Therefore, in the case of the eight-cylinder engine as well as the four-cylinder engine according to the embodiment of the invention, the rotational fluctuation ΔNE may be computed by subtracting, from the 30-degree rotation required time length T30 at that time, the 30-degree rotation required time length T30 that is calculated at a timing preceding the value at that time by 180 degrees in terms of the rotational angle of the crankshaft 26.

With the misfire determination device for the internal combustion engine according to the embodiment of the invention, the rotational fluctuation ΔNE is computed using the time length required for rotation of the crankshaft 26 or the rotary shaft of the motor MG1 by 30 degrees (the 30-degree rotation required time length T30). However, the rotational fluctuation may be computed using a rotational angular velocity that is equivalent to the inverse of the 30-degree rotation required time length T30. In this case, the inverse of the first threshold NEref1 and the inverse of the second threshold NEref2 may also be used.

In the embodiment of the invention, the misfire determination device for the engine 22 mounted in the hybrid automobile that is equipped with the engine 22, the motor MG1, the motor MG2 and the planetary gear 30 has been described. However, the invention is applicable to a misfire determination device for an internal combustion engine mounted in a hybrid automobile of any configuration, as long as the internal combustion engine mounted in this hybrid automobile has a plurality of cylinders capable of outputting a motive power for running and the hybrid automobile is further equipped with an electric motor that is mechanically connected to an output shaft of this internal combustion engine.

A corresponding relationship between the main elements of the embodiment of the invention and the main elements of the invention mentioned in the section of SUMMARY OF THE INVENTION will be described. In the embodiment of the invention, the engine 22 is equivalent to "the internal combustion engine", the motor MG1 is equivalent to "the electric motor", and the engine ECU 24 and the motor ECU 40 are equivalent to "the misfire determination device". A determination on a misfire in the invention may be made using at least one of the ECU's.

Incidentally, the corresponding relationship between the main elements of the embodiment of the invention and the main elements of the invention mentioned in the section of SUMMARY OF THE INVENTION is an example for concretely explaining the mode for carrying out the invention mentioned in the section of SUMMARY OF THE INVENTION by the embodiment of the invention, and hence does not limit the elements of the invention mentioned in the section of SUMMARY OF THE INVENTION. That is, the invention mentioned in the section of SUMMARY OF THE INVENTION should be interpreted based on what is described in that section, and the embodiment of the invention is nothing more than a concrete example of the invention mentioned in the section of SUMMARY OF THE INVENTION.

The mode for carrying out the invention has been described above using the embodiment thereof. As a matter of course, however, the invention is not at all limited to this embodiment thereof, but can be carried out in various modes within such a range as not to depart from the gist of the invention.

The invention can be utilized in industries for manufacturing hybrid vehicles and the like.

What is claimed is:

1. A misfire determination device for an internal combustion engine of a hybrid automobile, the internal combustion engine including a plurality of cylinders that output a motive power for running, the hybrid automobile including an electric motor mechanically connected to an output shaft of the internal combustion engine, the misfire determination device comprising
    at least one electronic control unit programmed to
    a) calculate a rotational fluctuation of the internal combustion engine in the unit of a time length,
    b) calculate a rotational fluctuation of the electric motor in the unit of a time length, and
    c) determine that a misfire may be occurring in at least one of the cylinders of the internal combustion engine when (i) the rotational fluctuation of the internal combustion engine has exceeded a first threshold and (ii) the rotational fluctuation of the electric motor that is calculated at a time preceding a time when the rotational fluctuation of the internal combustion engine that has exceeded the first threshold is calculated by a predetermined crank angle is smaller than a second threshold.

2. The misfire determination device according to claim 1, wherein
    the predetermined crank angle is a crank angle of an ignition cycle of the internal combustion engine.

3. The misfired determination device according to claim 1, wherein
    the electronic control unit is programmed to determine that a misfire is occurring in the internal combustion engine when the electronic control unit determines a predetermined number of times or more that a misfire may be occurring in at least one of the cylinders of the internal combustion engine.

4. The misfire determination device according to claim 1, wherein
the electronic control unit is programmed to calculate a difference in time length required for rotation by a predetermined rotational angle as the rotational fluctuation.

* * * * *